Dec. 9, 1941.    J. L. HEARN    2,265,482
FISH LURE
Filed Sept. 14, 1940    2 Sheets-Sheet 1
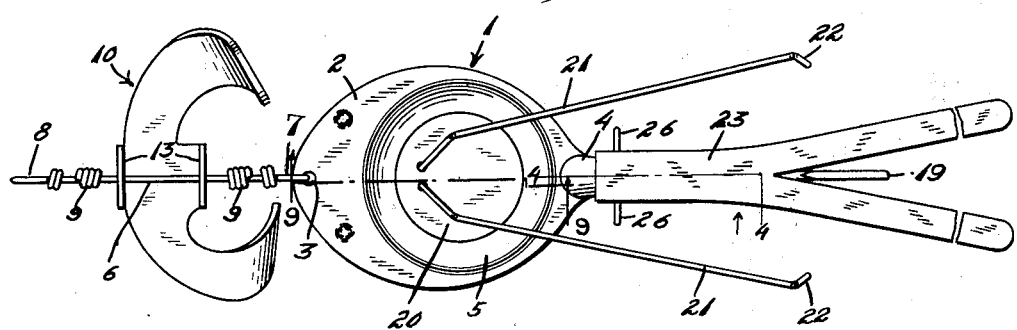
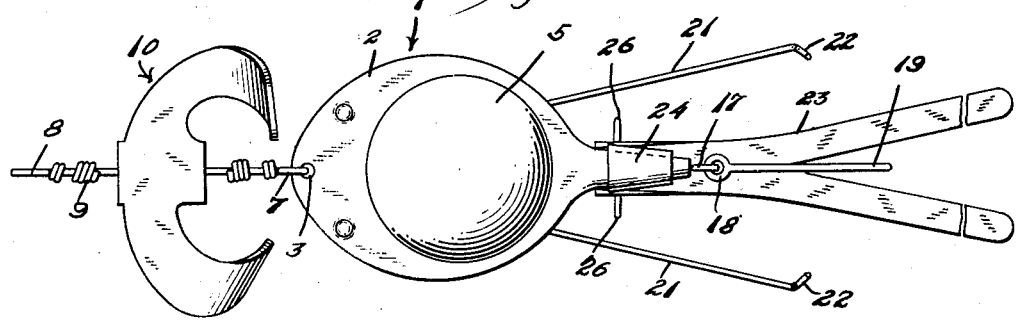
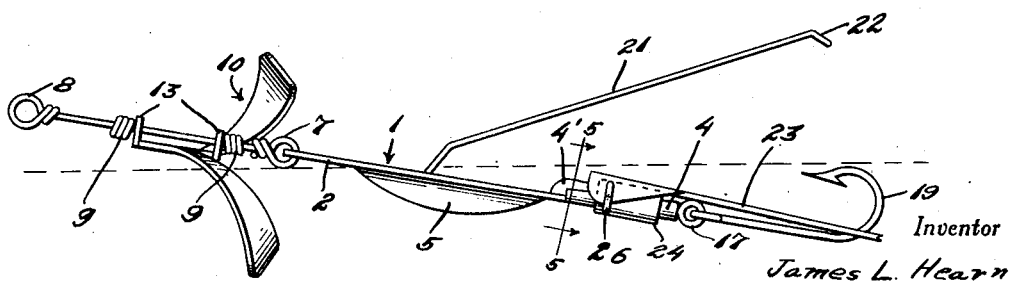
Inventor
James L. Hearn
By Clarence A. O'Brien
Attorney Dec. 9, 1941.    J. L. HEARN    2,265,482
FISH LURE
Filed Sept. 14, 1940    2 Sheets-Sheet 2
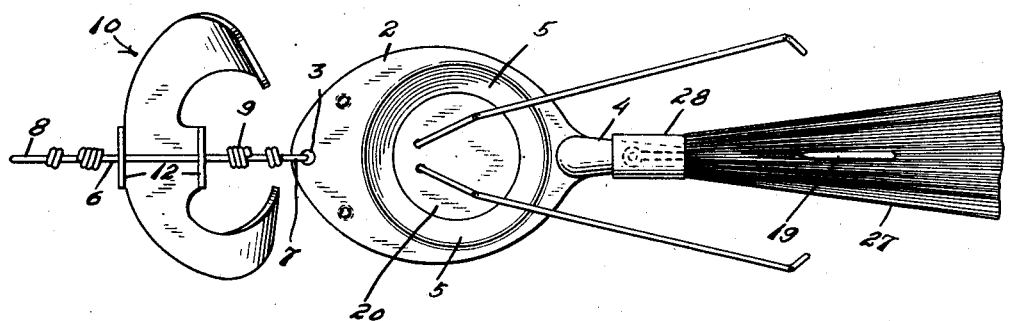
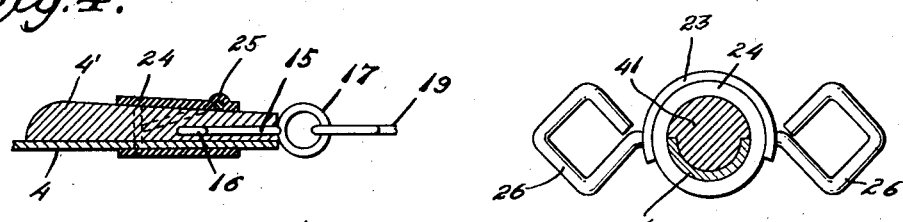
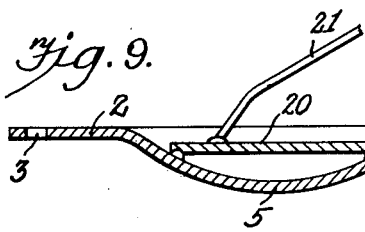
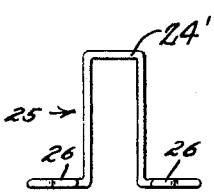
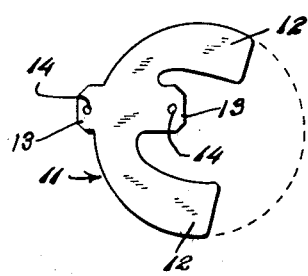
Inventor
James L. Hearn
By *Clarence A. O'Brien*
Attorney Patented Dec. 9, 1941

2,265,482

UNITED STATES PATENT OFFICE 2,265,482

FISH LURE

James L. Hearn, Mexia, Tex.

Application September 14, 1940, Serial No. 356,870

2 Claims. (Cl. 43—42)

My invention relates to improvements in fish lures of the baited type.

The principal object of the invention is to provide a durable lure which may be brought to the surface by a slow easy pull, will skim along the surface, will not become fouled by weeds or the like, is adapted to be equipped with interchangeable different type bait, and is substantially self-propelling under pull exerted on the line.

Other objects are also comprehended by my invention, all of which, together with the precise nature of my improvements will be readily understood when the succeeding description and claims are read with reference to the drawings accompanying and forming part of this specification.

In said drawings:

Figure 1 is a view in top plan of the preferred embodiment of my improved lure equipped with one type of bait.

Figure 2 is a view in bottom plan,

Figure 3 is a view in side elevation,

Figure 4 is a view in longitudinal section taken on the line 4—4 of Figure 1 and drawn to an enlarged scale, Figure 5 is a view in transverse section taken on the line 5—5 of Figure 3 and drawn to an enlarged scale, Figure 6 is a view in plan of the bait-attaching member, and Figure 7 is a view of the blank from which the spinner is formed, Figure 8 is a view in top plan showing a modified bait equipment for the lure, Figure 9 is a view in longitudinal section taken on line 9—9 of Figure 1, and Figure 10 is a fragmentary view partly in longitudinal section and partly in top plan of the means for attaching the bait in the preferred embodiment of the invention.

Referring to the drawings by numerals, the basic element of my improved lure is a spoonlike body 1 of suitable light, strong metal, such as aluminum. The body 1 is substantially elliptical with a flat rim 2 having a front end formed with a small aperture 3 therein, a rear end rearwardly tapering extension 4, substantially semi-circular in cross-section, with its concave side uppermost and weighted with solder 4' to form a rearwardly tapering tail, and a circular, shallow bowl 5 offset rearwardly of the transverse axis of the body 1 in the longitudinal axis thereof. The purpose of the bowl 5 and tail will presently appear. A combined leader and spinner shaft 6 of stainless steel wire is attached at one end to the front end of the body 1 by means of a rear end loop 7 on the shaft extending through the aperture 3, said shaft having a similar front end loop 8 for attachment to the leader of the line, not shown. A pair of stops 9 suitably spaced apart on the shaft 6 and preferably formed of copper wire coils confine therebetween a spinner designated generally by the numeral 10.

The spinner 10 is formed of a blank 11 of aluminum, the blank being substantially crescent shaped as shown in Figure 7, with a pair of blade-like ends 12, and a pair of opposed intermediate ears 13 on opposite side edges thereof apertured centrally as at 14. The ears 13 are opposed in alignment and offset circumferentially of the blank, likewise the apertures 14. The ears 13 are bent at right angles to the edges of the blank 11 to form bearing members on one side of the spinner. The ends 12 of the blank are bent laterally in reverse directions so as to form hook-shaped propeller blades. The spinner thus formed is rotatably mounted on the shaft 6 between the stops 9 with the propeller blade trailing.

Referring now to the operation of the device, as so far described. Under pull on the line, not shown, the bowl 5 and the tail of the body 1 counterweight the body so that it is pointed upwardly and forwardly in the water to quickly rise to the surface and skim along the same, such counterweighting, when the body 1 reaches the surface, serving to facilitate skimming of the body over the surface in a manner which will be clear. By virtue of the described construction of the spinner 10, the blades act to propel the body 1 forwardly and to churn water to add to the attraction effect of the lure.

Embedded at one end in the solder 4' of the described tail is a hook coupling rod 15 having a front eyelet end 16 anchored in the solder and a similar rear end 17 to which the eyelet end 18 of the hook 19 is swiveled, as best shown in Figures 2, 3 and 4.

Suitably secured in the bottom of the bowl 5 is a metal disk 20 from which a pair of deflecting rods 21, of suitable resilient metal, extend upwardly and rearwardly of the body 1 upon opposite sides of the center of the body, respectively, and in rearwardly diverging relation, said rods functioning to fend off grass, and the like, and prevent the same from fouling the lure and terminating in inwardly and downwardly turned rear ends 22 to prevent the rods from snagging grass, weeds or other obstructions.

Means are provided for attaching to the described tail, the usual split pork rind bait 23 by one end thereof to trail the body lengthwise, said means comprising a tapered rubber sleeve 24 frictionally fitting over said tail, and a bait-holder 25 carried by said sleeve. The bait-holder comprises a resilient wire yoke member 26 fitting in the sleeve 24 to straddle the tail in rearwardly extending, inclined position and having a rear closed end 24' adapted to bear on said tail, as shown in Figure 10, said yoke member having a pair of terminal, laterally extending, square eyelets 26 projecting from diametrically opposite sides of the sleeve as best shown in Figure 5. The attached end of the pork rind bait 23 is stretched over the tail, and forced over said eyelets 26 so as to pinion the same on said eyelets, whereby the bait is firmly held to said tail.

The usual rubber strand "bucktail" bait 27, may, if desired, be substituted for the pork rind bait 23 by a rubber sleeve 28 on said bait 27 frictionally fitting over the tail as shown in Figure 8. Other forms of bait, not shown, may be similarly interchanged with the pork rind 23 as desired. Also, a double hook, not shown, may be substituted for the single one illustrated.

The foregoing will, it is believed, suffice to impart a clear understanding of my invention without further explanation.

Manifestly the invention, as described, is susceptible of modification in other respects than as set forth, and right is herein reserved to such other modifications as fall within the scope of the subjoined claims.

Having described the invention, what I claim is:

1. A fish lure comprising a spoon-like body including a substantially elliptical flat rim having a front end, and a transversely curved dished bottom of circular form, whereby said body is adapted under pull exerted on said front end thereof to skid along the surface of the water, said rim being provided with a tail extension counterweighted to cause said body to assume a forwardly and upwardly inclined position in the water facilitating under pull thereon rise of the body from a submerged position to the surface of the water and minimizing resistance to forward travel of said body over said surface, means to attach a line to said front end, means to detachably attach bait to said tail extension, comprising a yoke straddling said tail and having laterally extending eyelets for anchoring said bait thereto, and a sleeve fitting over said yoke and tail to secure the yoke to the tail.

2. A fish lure comprising a spoon-like body including a substantially elliptical flat rim having a front end, and a transversely curved dished bottom of circular form, whereby said body is adapted under pull exerted on said front end thereof to skid along the surface of the water, said rim being provided with a tail extension counterweighted to cause said body to assume a forwardly and upwardly inclined position in the water facilitating under pull thereon rise of the body from a submerged position to the surface of the water and minimizing resistance to forward travel of said body over said surface, means to attach a line to said front end and means to obviate fouling of said body by obstructions in the water comprising a pair of deflector rods upon opposite sides of the longitudinal axis of said body arising therefrom and extending rearwardly in diverging relation.

JAMES L. HEARN.